May 14, 1946.   H. F. BAKEWELL   2,400,187
ROTARY CUTTING TOOL
Filed July 15, 1944
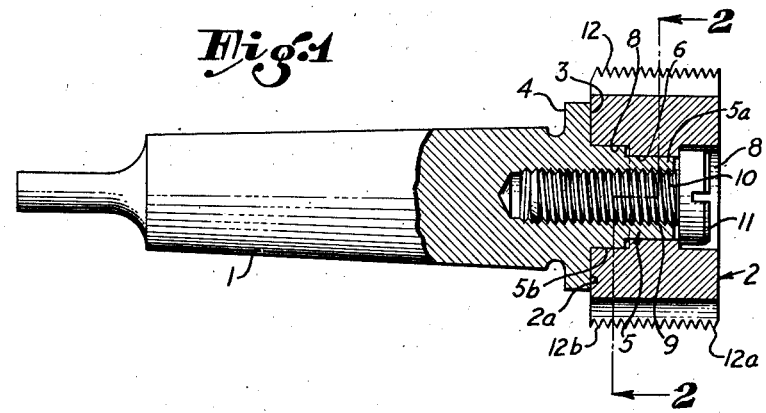
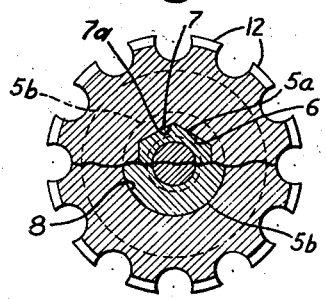
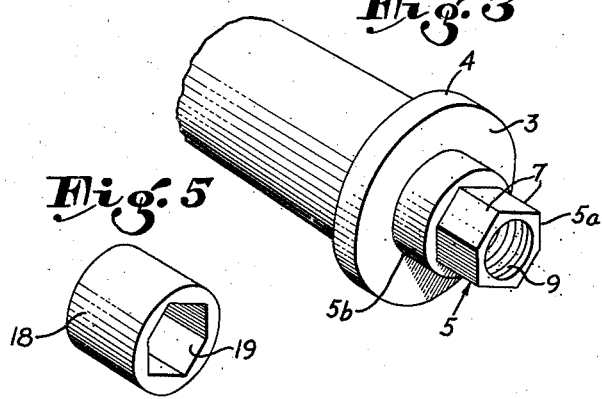
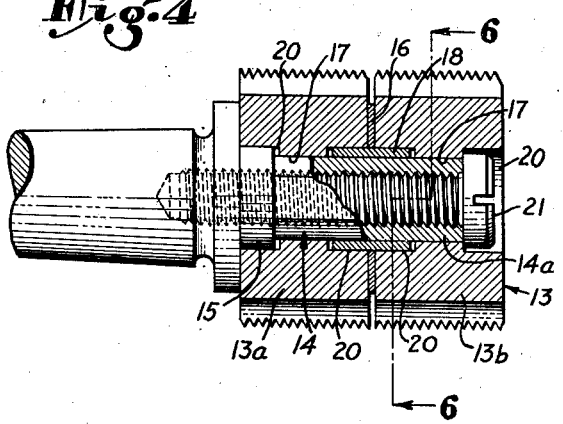
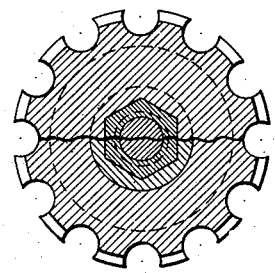
Inventor
HARDING F. BAKEWELL.
By
Attorney Patented May 14, 1946

2,400,187

UNITED STATES PATENT OFFICE 2,400,187

ROTARY CUTTING TOOL

Harding F. Bakewell, San Marino, Calif.

Application July 15, 1944, Serial No. 545,111

12 Claims. (Cl. 10—146)

This invention relates to rotary cutting tools of the general type described in my issued Patent No. 2,369,273.

The invention disclosed in my prior application involves a construction for the shank and cutting means that enabled the cutting means to be carried on the shank in an initial position, and also in a reversed position; in the latter position, or relation, the cutter teeth that had been the last to come into action then became the first to act upon the work. In much of the work performed by such cutting tools, for example, in cutting of threads, most of the work of the cutter is performed by the cutting teeth that commence the cutting operation. Consequently these teeth are subject to greater wear than the teeth at the other end of the cutter.

My prior invention provided a correlated construction for the shank and the cutting means that enabled the cutting means to be removed from the shank, and replaced and secured in a reversed position, thereby enabling the wear at both ends of the cutting means to be more or less equalized in practice; this effects an economy by lengthening the life of the tool before the necessity of redressing.

One of the objects of the present invention is to provide a practicable construction which differs from that employed in my first application and presents other, and different correlated features of construction for the shank of the tool and the cutters carried by it.

This invention can be practiced by employing a single cutting tool mounted reversibly on the shank, and also provides for the use of a plurality of cutter members which can be reversed so that the "following" cutter operating on the work, could become the leading cutter.

This invention may be embodied in a tool adapted to perform different functions, for example it may be employed as a tap for forming a female thread, as a reamer, as a miller, or other specific operations. In any case the exterior of the tool would be formed with cutter teeth formed so as to adapt them particularly for the function they are to perform. As stated, in this tool the cutter is removably mounted on the shank; and the cutter and shank have a correlated construction for effecting a driving connection enabling the rotation of the shank to be imparted to the cutter. These parts are also correlated in form at another point so as to effect the centering of the cutter on the shank. One of my objects is to provide a construction in which the driving torque is imparted to the cutter means substantially in the medial plane of the cutter means.

Another object of the invention is to provide a construction for a tool of this type in which the interengaging driving means on the shank and the cutting member are held securely in driving engagement with each other so as to resist rotation of the cutting member relative to the shank in both directions of said relative rotation.

Further objects and advantages of the present invention will be pointed out hereinafter or will be apparent from the following specification.

The accompanying drawing illustrates rotary cutting tools in accordance with my invention, and referring thereto:

Fig. 1 is a partly sectional side elevation through a cutting tool embodying my invention and illustrates the invention as applied to a single type cutter, that is to say, a tool in which the cutting means is composed of a single cutter member that is mounted on the shank of the tool.

Fig. 2 is a transverse section of the tool shown in Fig. 1 as taken along line 2—2 therein;

Fig. 3 is a perspective of the cutter end of the shank and particularly illustrating the preferred features of construction I employ for facilitating the mounting of the cutting means, and for enabling the cutter means to be readily attached in a reversed position.

Fig. 4 is a side elevation of the outer end of the shank, portions of the structure being broken away and shown in section or partial section, so as to disclose the invention as applied to a multiple type or duplex type of cutter, that is to say, a double cutter tool;

Fig. 5 is a perspective of a sleeve or ferrule that may be employed as one of the elements of the combination of parts illustrated in Fig. 4; and Fig. 6 is a transverse section taken on line 6—6 in Fig. 4.

In practicing the invention a rotary shank 1 is employed for supporting the cutting means. In Fig. 1 this shank is illustrated as supporting cutting means 2 consisting of a single cutter member.

The shank illustrated is tapered to adapt it to be received in a rotary chuck of a machine tool, that rotates the shank to drive this cutting tool, but it should be understood that the shank may be of cylindrical form or any other form that would enable it to be supported and rotated on its own axis to drive the cutting means that it carries.

The cutting means 2 is of annular form and is preferably so constructed internally that it can be removably mounted, thereby enabling it to be removed and replaced in a reversed position. In order to accomplish this I provide the shank 1 with a shoulder forming a seat or seat face 3 that in the present instance is a flat face located in a plane extending normal to the axis of the shank.

As illustrated, this seat face 3 has considerable area and is formed as the face of a flange 4 that projects out more or less from the side of the shank.

The cutting means is carried on an axial extension 5 that extends out beyond the location of the seat face and flange 4, and comprises a driving portion 5a. In the present instance this driving portion is spaced from the seat face or seat 3 so that it is located substantially at the middle portion intermediate the ends of the cutting means. The cutting means has a central opening extending axially therethrough. The middle portion of the cutting member 2 is formed interiorly into a driven portion or socket 6 intermediate and spaced from the ends of said cutting member. The driving portion 5a and the socket 6 have a correlated shape so that when the socket is on the driving portion 5a a driving connection is established for imparting rotary movement from the shank 1 to the cutting means 2.

In the present instance the driving portion or driving neck 5a is formed so that it presents a plurality of circumferentially spaced outwardly projecting longitudinally extending shoulders 7. These shoulders are preferably formed as angles of a polygon such as embodied in a hexagon shape as illustrated. The socket 6 is also hexagonal in shape and fits snugly to this hexagonal driving portion, being provided with a plurality of circumferentially spaced inwardly projecting longitudinally extending shoulders 7a in position to be drivingly engaged by shoulders 7. Between the driving portion 5a and the seat face 3 a supporting and centering portion or neck 5b is located. This centering portion 5b is preferably of cylindrical form, and coaxial with the driving portion 5a and the diameter thereof is at least equal to and preferably greater than the maximum diameter of portion 5a. Each end of the cutting means 2 is provided with an enlarged central recess or socket 8 of sufficiently large diameter to enable either socket to pass over the driving portion 5a of the shank and into engagement with the supporting and centering portion 5b, and said socket 8 preferably fits accurately to the portion 5b so as to function as centering means for the cutter. These sockets are preferably of the same depth, which in the present instance is slightly greater than the length of the cylindrical portion 5b. The sockets 8 are preferably arranged in an end-for-end symmetrical fashion with respect to the medial driven portion defined by the polygonal socket 6.

Suitable means are provided for retaining the cutting means 2 in position; in the present instance, with its inner end 2a against the seat face 3. For this purpose I prefer to provide the end of the extension 5 with a threaded bore or socket 9 to receive a machine screw 10 having a head 11, the peripheral edge of which projects beyond the edge of the socket 6 in position to engage the forward edge of the driven portion of the cutter 2 and force said cutter against the face 3.

The cutting means 2 may have cutting teeth on its periphery of a form to adapt it to perform any desired kind of cutting operation. In the present instance the cutting member is formed with thread cutting teeth 12 spaced circumferentially as shown, as in a conventional thread cutting tool, or tap.

In using this tool, of course, the cutting means 2 commences to cut with the teeth 12a that are located at its outer (forward) end, and these teeth will bear the brunt of the work, and consequently will suffer more wear than the cutting teeth that are located toward the other end. With the organization of parts described above, it will be evident that whenever desired, the cutting means 2 may be slipped off the extension 5, after removing the screw 10. It may then be relatively reversed, replaced, and secured by the screw 10 in position, with the end which formerly extended forwardly now against the seat 3. This will bring the teeth 12b formerly at the inner end of the cutter into thread-forming position. The location of the worn or dulled teeth 12a at the rearward end of the cutter will not degrade the work performed by the cutter in any fashion.

The same principles as those employed as above, are also employed in producing a tool with multiple or double type of cutting means 13 illustrated in Figs. 4–6. In this case the cutting means is composed of two cutter members 13a and 13b which may be substantially identical in form, and are preferably of the same internal configuration and dimensions as the single cutter 2 illustrated in Fig. 1, so that the cutters can be used interchangeably whenever desired in the single or the double type of cutting tool.

In the case of the double-cutter type, however, the driving portion or neck 14a of the extension 14, corresponding to the axial extension 5 above, is long enough to extend through the multiple cutters such as the cutters 13a and 13b when mounted end to end on the extension 14. The supporting neck or cylindrical centering portion 15 is preferably of the same diameter and length as the cylindrical portion 5b of the extension 5.

If the cutting members 13a and 13b are thread cutters such as the cutter 2, a spacer 16 in the form of a shim of proper thickness should be provided between the adjacent end faces of cutters 13a and 13b so as to insure that the threads of the two cutting members will be in the same phase. In this way the teeth of the inside cutter will always "track along" properly in the path of the teeth of the leading cutter 13b.

Between the adjacent driving sockets 17 of the cutting members, if desired, a sleeve or ferrule 18 may be provided. This sleeve is illustrated in perspective in Fig. 5, which will be provided with a hole or opening 19 through it, to fit nicely over the hexagonal portion 14a of the extension 14 and a cylindrical periphery adapted to fit within the cylindrical end sockets 20 of the cutter members. The shim 16 will be provided with a circular central opening to center it on the sleeve 18.

By removing the retaining screw 21 the cutters 13a and 13b can be removed. They can be substituted one for the other, if desired, without reversing either of them and/or they can be replaced with either or both of them in a reversed position. These alterations in relative position may be utilized to equalize the wear on the cutter teeth. The multiple type of cutter illustrated in Figs. 4–6 is particularly advantageous if the material of the work being cut is hard, because in that case the leading cutter can be constructed with slightly different cutting teeth from the inside cutter; so that the leading cutter would take a roughing cut in the work, and the "follower," or trailing cutter would take the finishing cut.

The polygonal form for a driving connection such as illustrated has many advantages over a driving connection involving the use of a key or splines, one of these advantages being that the polygonal neck can readily be finished to the desired dimensions with the use of simple forms of cutting tool such as a broach. The polygonal shaped connection is necessarily formed quite accurately in order to insure that it functions to center the cutter if reliance were placed solely on this member for such centering. By combining a cylindrical coacting centering neck and socket, with the multiple shoulder driving connection, it becomes unnecessary to have the driving connection formed with such extreme accuracy, because this driving conection merely performs the function of imparting the driving torque while the cylindrical neck and cylindrical socket cooperate to do the centering for the combination.

Many other embodiments of this invention may be resorted to without departing from the spirit of the invention, and I do not choose to be limited to the specific embodiments described and illustrated herein, but rather to the scope of the subjoined claims.

I claim:

1. A rotary cutting tool having an axis about which it is rotated in performing a desired cutting operation, which comprises, in combination: an axially extending shank member having a forwardly directed seat face disposed normal to said axis and concentric therewith, a cylindrical centering portion extending axially forwardly of said seat face and of less diameter than said seat face, and a driving portion extending forwardly of said centering portion, said driving portion being formed externally to provide a plurality of circumferentially spaced outwardly projecting longitudinally extending shoulders, the maximum diameter of said driving portion including said shoulders being not greater than the diameter of said centering portion; cutting means removably mounted on said shank in a coaxial relation, said cutting means being provided with a seat face at each end thereof, each seat face being adapted for engagement with said first named seat face, a socket at each end thereof, each socket being shaped for coacting engagement with said centering portion when the corresponding seat face is in engagement with the seat face provided on said shank member, and with a driving socket interconnecting said end sockets and shaped for coacting engagement with said driving portion when either of said end sockets is in coacting engagement with said centering portion; and retaining means disposed axially within said driving portion of said shank in engagement with said shank and said cutting means to maintain said first and second named seat faces in close compressive engagement with one another.

2. A rotary cutting tool according to claim 1, in which the sockets specified for said cutting means are of cylindrical configuration and adapted for close mechanical engagement with said cylindrical centering portion of said shank.

3. In a rotary cutting tool, the combination comprising: a shank having a transversely disposed seat face with a cylindrical portion of lesser diameter adjacent to, and projecting beyond, the same; and having a driving portion beyond the cylindrical portion, said driving portion being formed externally to provide a plurality of circumferentially spaced outwardly projecting longitudinally extending shoulders and the maximum diameter of said driving portion including said shoulders being not greater than the diameter of said centering portion; reversible cutting means consisting of an annular cutting member having circumferentially disposed cutter teeth, removably mounted on said shank in a position surrounding said cylindrical portion and driving portion of said shank, seating at its inner end against said seat face; said cutting means being formed internally at an intermediate point of its length with a socket shaped to engage said shoulders and form a driving connection with said driving portion; each end of said cutting means having a socket, each of which end sockets being so dimensioned as to fit over said cylindrical portion of said shank in sliding engagement therewith; and retaining means extending coaxially through said cylindrical and driving portions of said shank for retaining the cutter means on the shank.

4. In a rotary cutting tool, the construction comprising: a shank having an extension comprising a shouldered cylindrical portion and a polygonal driving portion extending beyond the cylindrical portion; reversible cutting means received over said extension, having a socket in each end capable of sliding engagement with said cylindrical portion; said cutting means having a polygonal socket of a diameter not greater than that of said end sockets, said polygonal socket interconnecting said end sockets and snugly fitting to the polygonal portion so as to form a driving connection therewith; and a retaining screw seated at the end of said polygonal portion for retaining the cutting means on said necks.

5. In a rotary cutter tool, the combination comprising: a shank having an extension with a shouldered cylindrical portion and a driving portion extending beyond the cylindrical portion of a diameter not greater than that of said cylindrical portion, said driving portion being of polygonal cross-section; a reversible annular cutting member having a socket in each end to fit over and center on the said cylindrical portion, and having a polygonal form socket between its cylindrical sockets fitted to said driving portion; and means mounted at the end of said polygonal portion for retaining the cutter on said extension.

6. In a rotary cutting tool the combination comprising: a shank having a seat face disposed normal to the longitudinal axis of the shank, and having a coaxial extension of reduced diameter projecting beyond said seat face, said extension having a driving portion spaced from said seat face and of a diameter not greater than the portion adjacent said seat face; reversible cutting means having cutting teeth, and a coaxial internal driving socket located intermediately of its length, said driving portion and said driving socket having a correlated shape so as to form a driving connection between the same; each end of said cutting means having a socket capable of passing over the portion of said extension between said driving portion and said seat face; and means mounted in the end of said extension for retaining the cutting means on the extension with its inner end against said seat face.

7. In a rotary cutting tool, the combination comprising: a shank having a seat face disposed normal to the longitudinal axis of said shank, said shank having an extension projecting from said seat face and formed externally to provide a plurality of circumferentially spaced outwardly projecting longitudinally extending driving shoulders; a plurality of interchangeable annular cutters carried on said extension, each cutter having an internal driving socket located intermediately of its length and having a form enabling the same to make a driving connection with said extension; each end of said cutters having a coaxial end socket extending into the same, said end socket being of a diameter at least as great as said internal driving socket; and retaining means mounted at the outer end of said extension and engaging in one of said end sockets to retain the cutters between the same and said seat face.

8. In a rotary cutting tool, the combination comprising: a shank having a seat face disposed normal to the longitudinal axis of said shank, said shank having an extension projecting from said seat face with a cylindrical portion of less diameter than said seat face, and having a driving neck formed externally so as to provide a plurality of circumferentially spaced outwardly projecting longitudinally extending shoulders, said driving neck being of a diameter not greater than said cylindrical portion, a plurality of interchangeable annular cutters disposed end to end on said extension, each cutter having an internal driving socket located intermediately of its length having a form enabling the same to make a driving connection with said driving neck, each end of each of said cutters having a coaxial end socket extending into the same, and capable of passing over said cylindrical portion; and means for retaining the cutters on the extension.

9. A rotary cutting tool according to claim 8 in which a ferrule is provided on said extension between adjacent abutting ends of the cutters, and received in the adjacent end sockets.

10. In a rotary cutting tool, the combination comprising: a shank having a shoulder to form an end seat for cutting means, said shank having an extension projecting therefrom forwardly of said end seat and of less diameter than said end seat; a pair of interchangeable cutters carried in end-to-end arrangement on said extension, each of said cutters having a driving socket located intermediately of the length thereof, each cutter having an end socket of a diameter at least as great as that of such driving socket and extending in from the end thereof to said driving socket, said extension and said driving sockets having correlated shapes to effect a driving connection between the same; a sleeve surrounding the extension, housed in the end sockets at the adjacent ends of the cutters, and having an opening through the same fitting to the cross-section of said extension; a shim fitting over the sleeve and operating as a spacer for determining the distance between said cutters; and means mounted at the end of said extension for retaining said cutters, and for holding the end of the inside cutter up against said shoulder.

11. A rotary cutting tool, according to claim 10, in which the cutting tools both have thread cutting teeth of the same pitch; and in which the shim has the proper thickness to place the cutter teeth on the two cutters in the same phase with each other, thereby enabling the forward cutter teeth of the second cutter to follow in the path of the teeth of the first cutter.

12. A cutting member for rotary cutting tools, adapted to be removably and reversibly mounted on a shank and provided with peripherally disposed cutting elements, said member having a central opening extending axially therethrough and being formed interiorly to provide a polygonal socket portion intermediate and spaced from the ends of the cutting member and an enlarged cylindrical recess adjacent each end of the cutting member interconnecting with said polygonal socket, said polygonal socket portion having a plurality of circumferentially spaced inwardly projecting longitudinally extending shoulders.

HARDING F. BAKEWELL.